Sept. 28, 1937.                A. E. BOWEN                 2,094,116
                        EARTH RESISTIVITY MEASUREMENT
                          Filed June 12, 1935          2 Sheets-Sheet 1
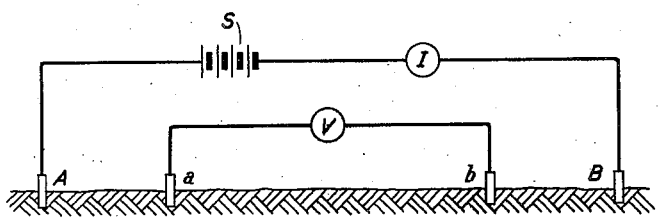
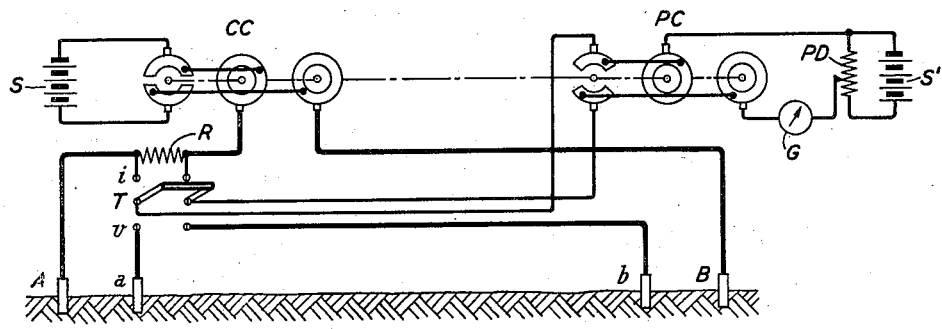
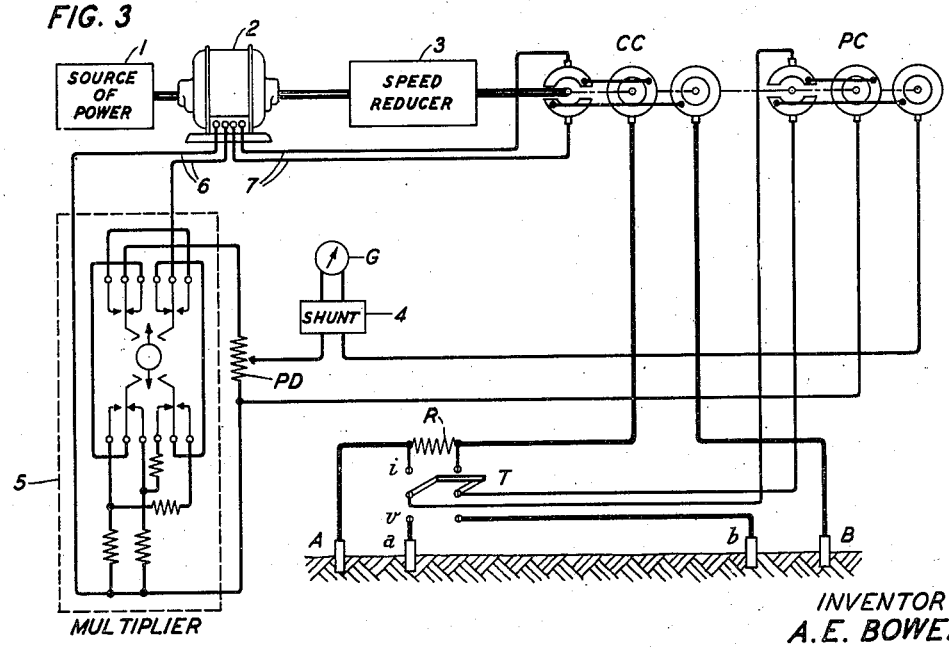
INVENTOR
A. E. BOWEN
BY
ATTORNEY Sept. 28, 1937.                A. E. BOWEN                 2,094,116
                        EARTH RESISTIVITY MEASUREMENT
                        Filed June 12, 1935      2 Sheets-Sheet 2

INVENTOR
A. E. BOWEN
BY
ATTORNEY

Patented Sept. 28, 1937

2,094,116

UNITED STATES PATENT OFFICE 2,094,116

EARTH RESISTIVITY MEASUREMENT

Arnold Everet Bowen, Red Bank, N. J., assignor to American Telephone and Telegraph Company, a corporation of New York Application June 12, 1935, Serial No. 26,297

6 Claims. (Cl. 175—182)

This invention relates to the measurement of the mutual impedance of earth-return circuits and more particularly to methods of, and apparatus for, measuring earth-resistivity.

Where a high power transmission line and a signaling line parallel each other for a considerable distance, the current in the power line may induce excessive voltages in the signaling line. Since the magnitudes of these voltages are greatly influenced by the average resistivity of the earth in the region occupied by the lines, accurate calculation of the voltages requires a knowledge of the average earth resistivity. Such knowledge is also useful in the design of remedial devices for reducing the magnitudes of the induced voltages. The present invention is designed to permit an accurate survey of earth-resistivity conditions to be made.

The invention has application also to the determination of the contour of substrata of the earth and particularly to the location of oil and mineral deposits by what is commonly known as the earth-resistivity method.

In accordance with one method known heretofore for measuring earth-resistivity, current is passed through the earth between two ground electrodes spaced apart a considerable distance, and an indication is obtained of the potential drop existing between two intermediate ground electrodes. From the ratio of potential drop across the "secondary circuit" to the current in the "primary circuit", the resistance of the earth between the intermediate electrodes can be calculated, or by suitable electrical means obtained directly, and from the measured resistance and the spacing of the electrodes the average resistivity of the earth can be computed.

Several modifications of the basic measuring scheme are practically essential. Variable stray earth currents and ground electrode polarization tend to mask the voltage drop to be measured. It is usual therefore to reverse the primary circuit current at a low frequency, of three to ten cycles per second, for example, and synchronously to reverse the connection of the voltage measuring device in the secondary circuit so as to rectify the reversed current and permit a direct current measurement to be made. In this manner, the polarization and stray earth potentials are periodically reversed as they are applied to the voltage measuring device and so they have little effect, at least where the exploring circuits are of moderate length. Another factor is the electrode-to-ground resistance of the secondary circuit. This resistance may be measured independently and a corresponding correction applied to the observed secondary circuit voltage drop, or it may be eliminated from consideration by employing a null-balance or potentiometric method of measuring the secondary circuit voltage drop, i. e., a method in which no current is permitted to flow in the secondary circuit. Further account must be taken of the fact that the primary circuit and secondary circuit current reversing devices may not have the same ratio of conducting surface to insulation surface and these "commutator factors" must be introduced into the computations.

An object of the present invention is to increase the accuracy and simplify the construction of earth-resistivity measuring instruments of the type described.

Another and more specific object of the invention is to eliminate the vitiating effect on the measurements of variations in the voltage of the primary circuit current source.

A subsidiary object is to provide an instrument capable of measuring directly the ratio of the resistances of two contiguous earth paths.

A feature of the invention is that primary circuit current and secondary circuit voltages are separately passed through a common rectifying commutator before they are applied to the measuring device.

Another feature of the invention is that primary circuit current is measured by means responsive to the periodically reversed current, specifically by means responsive to the voltage drop across a series resistor in the primary circuit.

Another feature of the invention is an earth-resistivity measuring instrument of the potentiometric type, in which the voltage applied to the primary circuit and the balancing voltage for the potentiometer are both derived from a common source so that the ratio of the two voltages is constant despite variations in their absolute magnitudes.

Other objects and features of the invention will appear from a consideration of the specific illustrative circuits and apparatus that are now to be described. Reference will be made to the accompanying drawings, in which:

Figure 1 shows schematically an earth-resistivity measuring circuit that is the prototype of those that follow;

Fig. 2 shows a simple potentiometric or null-balance measuring circuit in accordance with the invention in which voltage and current are measured through the same rectifying commutator;

Fig. 3 shows a potentiometric measuring circuit which is independent of variations in the voltage of the measuring current source;

Figure 4:
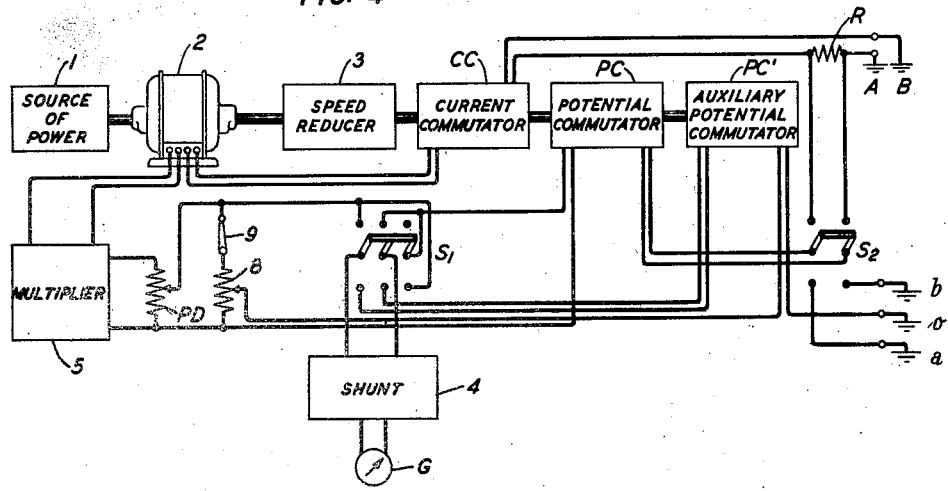
Fig. 4 shows a modification of the measuring instrument illustrated in Fig. 3 which adapts it to the determination of the ratio of the mutual resistances between two contiguous earth paths and a primary circuit.

Referring now to Fig. 1, there is shown a basic circuit for the determination of earth-resistivity or, more directly, the mutual resistance of two earth-return circuits. Current from a battery S or other suitable source is passed through a primary circuit to the ground electrodes A and B which may be spaced apart several hundred feet or more. Current traversing the earth-return path of the primary circuit causes a difference of potential to be established between various other points on the surface of the earth in the vicinity. The difference of potential thus established between any two such points may be measured by connecting ground electrodes $a$ and $b$ to a secondary circuit comprising a voltage measuring instrument V. Knowing the primary circuit current, as measured by a suitable instrument I, and the secondary circuit potential drop, the mutual resistance of the two circuits may readily be calculated. Since it is only the ratio of potential difference to current that is of interest and not the absolute magnitude of these quantities, various modifications of the basic circuit are possible, and means may be provided for measuring this ratio directly.

Stray earth potentials and polarization effects at electrodes $a$ and $b$ are often found to be of such magnitude that it is difficult to distinguish the change in voltage in the secondary circuit that arises from the primary circuit current. The first mentioned source of disturbances is slowly variable with respect to time and both are usually unidirectional.

In the circuit shown in Fig. 2 the effect of stray earth potentials and electrode polarization is largely reduced by providing means for periodically reversing the primary circuit current and synchronously reversing the connection of the measuring instrument in the secondary circuit. This means is shown as a current reversing commutator CC comprising slip rings and a split commutator connected in series in the primary circuit, and a similar potential reversing commutator PC connected in series in the secondary circuit and mechanically coupled to the primary circuit commutator. With double-throw double-pole switch T in its lower or $v$ position the potential drop across the secondary circuit is applied through the potential reversing commutator PC to galvanometer G. An opposing voltage from the fixed voltage source S' is applied to the secondary circuit through potential divider PD which is adjusted until the galvanometer needle indicates zero current in the secondary circuit. The adjustment of the potential divider is a measure of the voltage appearing in the secondary circuit.

Primary circuit current is determined preferably in the manner illustrated, viz., by measuring the periodically reversed voltage drop across a resistance R connected in series in that circuit. With switch T in its upper or $i$ position the voltage across resistance R is rectified in the same potential commutator PC and a balance is obtained by means of the potentiometer-meter combination.

To avoid the transient effect incident to the opening and closing of the primary circuit by the commutator CC, the segments of the potential reversing commutator PC are made of such length that the secondary circuit is closed for a shorter time than the primary circuit; and their relative positions are such that the secondary circuit is not closed until a short time after the primary circuit has been completed and it is opened shortly before the primary circuit is opened. Thus it is possible to make the measurement of both current and voltage while these quantities are constant in amplitude.

The measuring instrument illustrated in Fig. 3 is similar in basic respects to that shown in Fig. 2, but is featured by the means provided for supplying primary circuit current and the voltage for the secondary circuit potentiometer. In discussing the circuit of Fig. 2, it has been assumed that the sources S and S' are batteries of constant voltage. A direct current generator driven by hand or by a gas engine would be well adapted for field purposes in preference to a battery but because of variation in the speed of rotation, the voltage is too much subject to variation to permit a balance to be effected in the potentiometer circuit. In the circuit now under consideration the objection to a variable voltage source is obviated by employing the varying voltage for both the primary circuit current source and the secondary circuit potentiometer source.

Specifically, there is provided a double-winding direct-current generator 2 driven by a source of power 1 which may be, for example, a hand operated crank. One of the generator windings is connected through leads 6 and through the constant resistance adjustable attenuation multiplier 5 to the potential divider PD. The other winding is connected through leads 7 and the current reversing commutator CC to the primary circuit.

Despite variations in the voltages generated in the two windings of the generator due, for example, to changes in the speed of rotation, the ratio of the two voltages remains substantially constant and the adjustment of the potential divider PD is not affected. The sensitivity of galvanometer G may be adjusted by means of the resistance shunt 4. The method of operating the instrument is practically the same as that described with reference to Fig. 2.

The measuring system illustrated in Fig. 4 is similar in general respects to that shown in Fig. 3 and corresponding elements have been similarly designated on the drawings. The circuit is featured by the means provided for measuring the ratio of the mutual resistances between the primary circuit AB and contiguous portions $ao$ and $ob$ of the secondary circuit $ab$. This ratio of mutual resistances, indicative of changes in earth-resistivity within the region surveyed, is often of as much interest in geophysical prospecting as is the actual magnitude of the earth-resistivity.

Referring to Fig. 4, the primary circuit comprises the high voltage winding of direct current generator 2, current reversing commutator CC, series resistor R, and ground electrodes A and B. With the exception of the auxiliary potential commutator PC', switch S₁, and the ratio dial 8, this instrument is the same as that of Fig. 3. When switch S₁ is in the upper position, the primary circuit current and the induced voltage in the secondary circuit can be measured by throwing switch $S_2$ first to its upper and then to its lower position, each time adjusting potential divider PD until galvanometer G indicates a balance. Following the second of these adjustments, the switch $S_2$ is left in its lower position, the runner on PD is left at the balance point, and switch $S_1$ is thrown to its lower position. The galvanometer is thereby connected, through the auxiliary potential commutator, between the runner of the ratio dial and the intermediate ground connection $o$. If then the runner of the ratio dial is adjusted until the galvanometer indicates zero, the ratio of the induced voltage in the interval $ao$ to that which is induced in the interval $ob$ is indicated directly by the ratio dial 8. If, for instance, the point $o$ is centrally located with respect to $a$ and $b$, and also with respect to A and B, the ratio as indicated by the ratio dial 8 is equal to the ratio of the average earth-resistivities in the intervals $ao$ and $ob$.

Figure 5A:
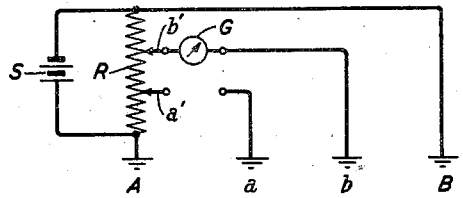
Figs. 5A, 5B and 5C illustrate an alternative method of measuring earth resistivity.
Figure 5B:
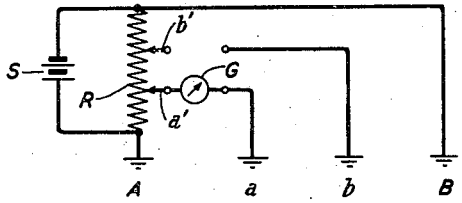
Figure 5C:
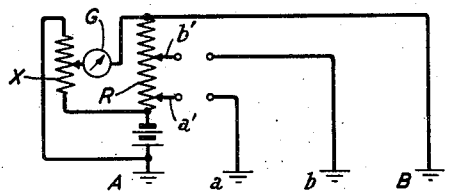

Figs. 5A, 5B and 5C illustrate a method of measuring the mutual resistance of two ground return circuits that is free from the effects of variable voltage sources, that is adapted for a wide range of values of mutual resistance, and that does not require the characteristics of reversing commutators to be known accurately. It is a null method in which no current flows in the secondary circuit. Current and potential reversing commutators and other features hereinbefore described may be employed in conjunction with this method, but they have been omitted from the drawings to permit a readier understanding of the invention.

Referring to Fig. 5A, the direct current source S is connected to the primary circuit electrodes A and B with a slide wire resistance R shunted across it. One of the two riders $b'$ on resistance R is connected through a galvanometer G to one of the secondary circuit electrodes $b$. The rider $b'$ is then adjusted so that no deflection is observed on the galvanometer.

As shown in Fig. 5B, the galvanometer G is then connected between secondary circuit electrode $a$ and rider $a'$, rider $b'$ being left unchanged in position. Rider $a'$ is adjusted so that the galvanometer needle does not deflect.

The difference in potential between the two riders is now the same as the difference in potential between the two ground electrodes $a$ and $b$. If the current flowing through resistance R be designated as $I_R$ and the resistance included between the two riders as $\Delta R$, then the voltage $V_{ab}$ induced in the secondary circuit is $$V_{ab} = I_R \times \Delta R$$

However, if the current in the primary circuit be $I_1$, and the mutual resistance between the two circuits be $R_{12}$, then $$V_{ab} = I_1 R_{12}$$

Combining these two equations, $$R_{12} = \frac{I_R}{I_1} \Delta R$$

In practice, of course, one rider instead of two may be employed.

The next step in the method is to measure the ratio $$\frac{I_R}{I_1}$$

This is accomplished by measuring the ratio of the resistance of the primary circuit ground return path to the resistance R, preferably, as illustrated in Fig. 5C, by a Wheatstone bridge method. The ground return path AB and resistance R are connected as adjacent arms of the bridge, potential divider X providing the ratio arms. Potential divider X may be calibrated to give directly the desired ratio of $$\frac{I_R}{I_1}$$

The mutual resistance $R_{12}$ may then be calculated from the known values of $\Delta R$ and current ratio.

What is claimed is:

1. A measuring system comprising primary and secondary earth-return circuits, a direct current source, a current reversing commutator for connecting said source in said primary circuit, a potentiometer, and means for rectifying and alternatively applying to said potentiometer the voltage induced in said secondary circuit and the induced voltage appearing between one end of said secondary circuit and an intermediate earthed point.

2. A combination for geophysical measurements comprising an exciter circuit and an exploring circuit, a direct current source of fluctuating amplitude periodically, reversibly connected in said exciter circuit, a potentiometer, means for deriving from said source a balancing voltage for said potentiometer, and means for alternatively applying to said potentiometer unidirectional voltages proportional respectively to the current in said exciter circuit and the voltage induced in said exploring circuit.

3. A combination for measuring earth resistivity comprising primary and secondary earth-return circuits, a manually driven direct current generator, means for periodically, reversibly connecting said generator in said primary circuit to provide an exciting current, a potentiometer, means for applying to said potentiometer a balancing voltage derived from said generator, means for mechanically rectifying the voltage induced in said secondary circuit and a voltage bearing a known amplitude relation to said exciting current, and means for alternatively applying the rectified voltages to said potentiometer.

4. The method of measuring earth resistivity with a combination comprising an exciter circuit and an exploring circuit which comprises periodically, reversibly energizing said exciter circuit from a source of fluctuating unidirectional current, rectifying the voltage induced in said exploring circuit, deriving from said exciter circuit a unidirectional voltage fluctuating in the same manner as said current and bearing a fixed amplitude relation to said current, obtaining a measure of the relative amplitudes of the rectified voltage in said exploring circuit and the voltage derived from said exciter circuit, and obtaining similarly a measure of the relative amplitudes of rectified exciter circuit current and the voltage derived from said exciter circuit, whereby the amplitude relation of said induced voltage and the exciter circuit current is determined or calculable.

5. The method of measuring earth resistivity with a combination comprising primary and secondary earth-return circuits and a direct current source of fluctuating amplitude reversibly connected in said primary circuit, which comprises deriving from said source a direct current voltage bearing a fixed amplitude relation to the primary circuit current, and successively determining the amplitude relation between said voltage and, respectively, rectified primary circuit current and rectified secondary circuit induced voltage.

6. A combination for geophysical measurement comprising primary and secondary earth-return circuits, a direct current source of fluctuating voltage periodically, reversibly connected in said primary circuit, an impedance series-connected in said primary circuit and traversed by the periodically reversed circuit flowing therethrough, a potentiometer, means for applying to said potentiometer a direct current balancing voltage fluctuating in amplitude in the same manner as said first-mentioned fluctuating voltage, and means including a current commutator for alternatively applying to said potentiometer unidirectional voltages derived from and proportional respectively to the voltage induced in said secondary circuit and the voltage appearing across said series impedance.

ARNOLD EVERET BOWEN.